UNITED STATES PATENT OFFICE.

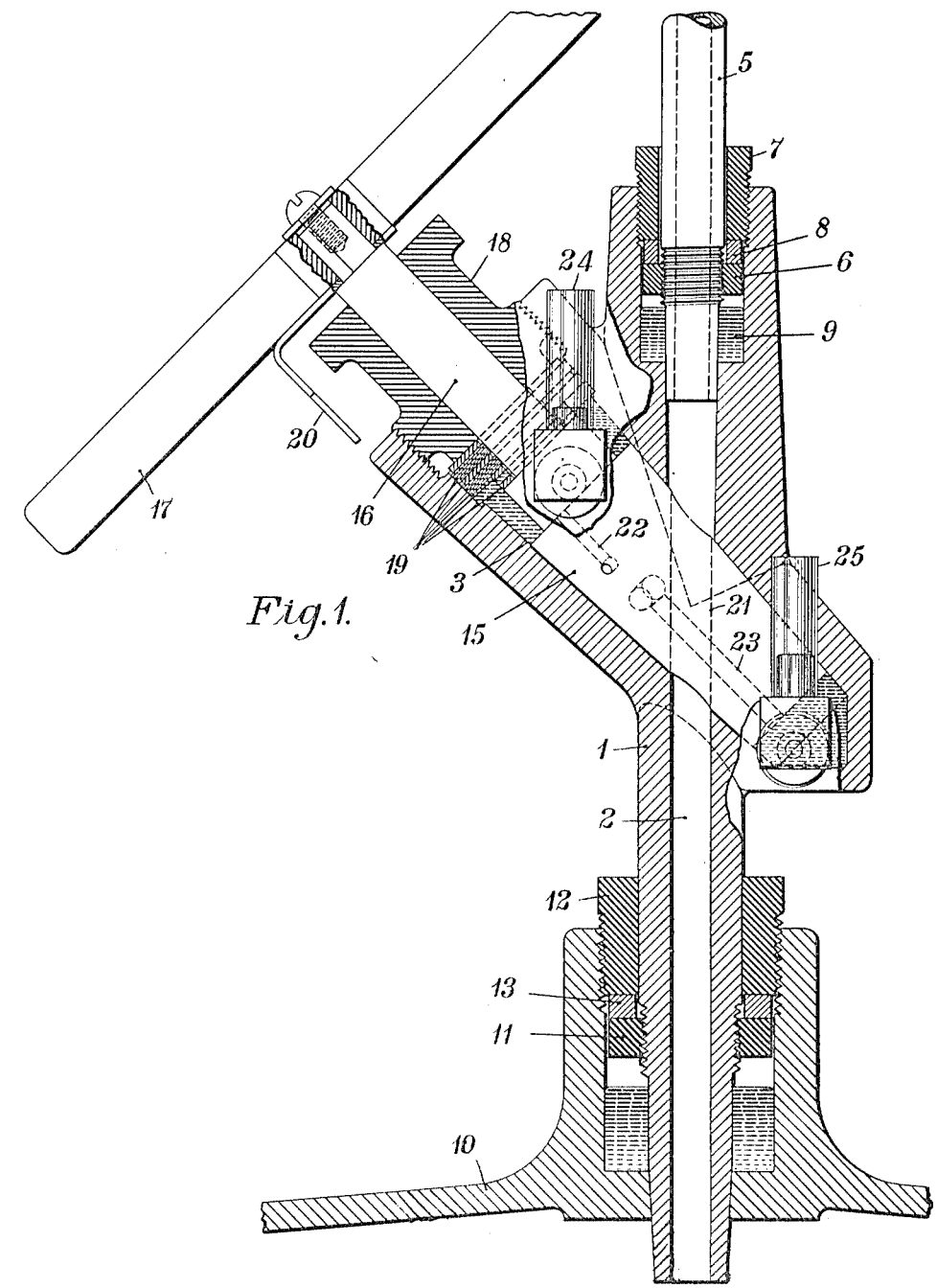

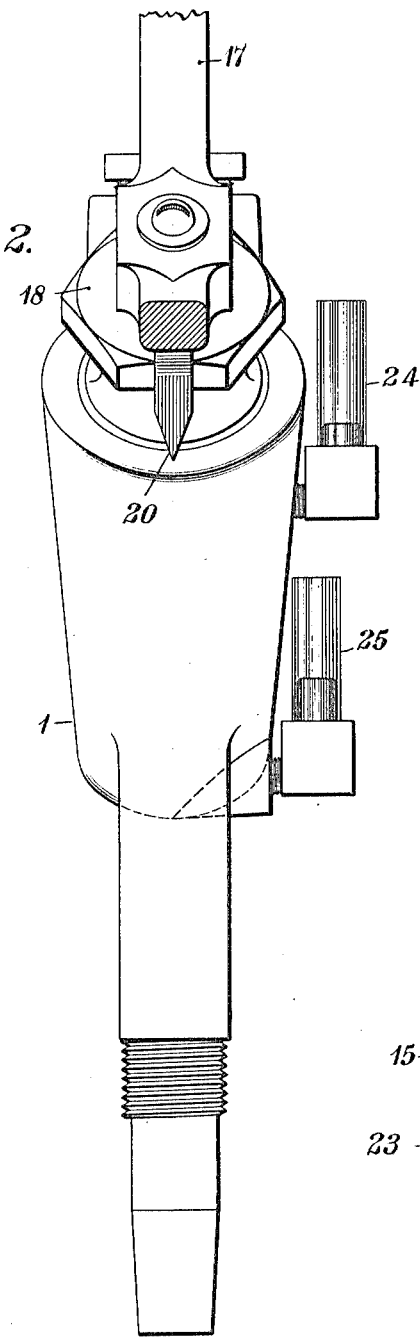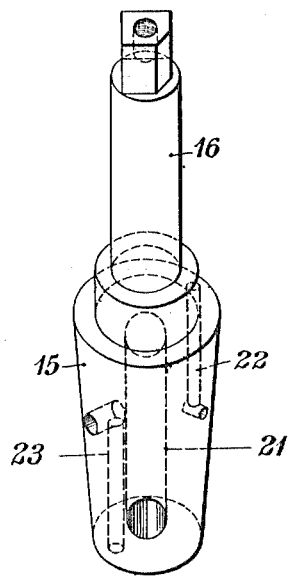

YASUDIRO SAKAI, OF EAST PITTSBURG, PENNSYLVANIA, ASSIGNOR TO WESTINGHOUSE ELECTRIC AND MANUFACTURING COMPANY, A CORPORATION OF PENNSYLVANIA.

STOP-COCK.

1,001,455.   Specification of Letters Patent.   Patented Aug. 22, 1911.

Application filed December 10, 1910. Serial No. 596,683.

*To all whom it may concern:*

Be it known that I, YASUDIRO SAKAI, a subject of the Emperor of Japan, and a resident of East Pittsburg, in the county of Allegheny and State of Pennsylvania, have invented a new and useful Improvement in Stop-Cocks, of which the following is a specification.

My invention relates to stop cocks and particularly to devices of this character that are employed for establishing and interrupting communication with vacuum chambers.

The object of my invention is to provide a stop cock of the character indicated which shall be exceptionally tight and effective and which shall permit of readily establishing and interrupting communication with a vacuum chamber in connection with which it is employed.

Figure 1 of the accompanying drawing is a side and sectional view of a device that embodies my present invention. Fig. 2 is a view of the device, at right angles to the view of Fig. 1, and Fig. 3 is a front elevation of the plug member of the device.

The device comprises a body member 1 that is provided with a bore or passage 2 extending entirely therethrough, and with an inclined and tapered bore 3 that crosses and communicates with the bore or passage 2. The upper end of the passage 2 is materially enlarged and, directly beneath the enlargement, it is slightly tapered for the reception of a correspondingly tapered end of a pipe 5 that leads to a pump (not shown), or other device which is adapted to be connected to or disconnected from the vacuum device in connection with which the stop cock is employed. A short distance above its tapered end, the pipe 5 is externally threaded for the reception of a nut 6 that constitutes a stop or flange against which pressure is applied by means of a bushing or nut 7 that is screwed into the upper enlarged end of the bore or passage 2, a washer 8 being interposed between the parts 6 and 7, and the space surrounding the pipe 5, within the enlarged end of the passage 2, being partially filled with a body of mercury 9. The parts 6, 7 and 8 constitute means for forcing the tapered end of the pipe 5 into the tapered upper end of the passage 2, a vacuum-tight joint between the said parts being thus provided, with the assistance of the mercury.

The lower end of the body member 1 of the device is tapered for insertion into a correspondingly tapered aperture in a device 10 in connection with which the stop cock is employed, the device 10 being of any suitable character, such as a vapor current rectifier. A short distance above its tapered lower end, the member 2 is threaded for the reception of a nut 11 upon which pressure is exerted in order to force the tapered end of the member 2 into the aperture in the member 10, by means of a bushing or nut 12 that is screwed into the member 10, a washer 13 being interposed between the parts 11 and 12.

Closely fitting an intermediate portion of the inclined and tapered bore 3 of the device, is a rotatable and correspondingly tapered plug or valve member 15 having a reduced shank portion 16 that extends out of the upper end of the said bore and is provided with an operating lever or crank 17. The plug 15 is forced into close engagement with the sides of the bore or passage 3 by means of a sleeve or nut 18 that is screwed into the upper end of the bore 3, suitable washers 19 being interposed between the end of the said sleeve or nut and the plug 15. The position of the plug is indicated upon the exterior of the device by means of a pointer 20 that is carried by the shank 16, and the spaces in the passage 3 above and below the plug 15 are adapted to be partially or wholly filled with mercury. The plug 15 is provided with a bore or passage 21 that extends transversely through it and at an inclination to its axis, the said passage being adapted to connect the upper and lower portions of the passage 2 when the plug occupies the proper position. The plug is also provided with communicating transverse and longitudinal drillings that provide a passage 22 between one side thereof and its upper end, which passage is adapted, when the plug occupies the proper position, to connect the space above the plug with the upper portion of the passage 2. The plug 15 is further provided with transverse and longitudinal drillings that communicate and provide a passage 23 between one side of the plug and the space below the same, the said passage being adapted, when the plug occupies the proper position, to connect the upper portion of the passage 2 with the said space.

The body member 1 is drilled laterally to provide passages connecting the spaces above and below the plug 15 with the exterior and, threaded into these passages, are gages or receptacles 24 and 25 that are adapted to contain the mercury for filling the spaces above and below the plug 15. The mercury constitutes a seal which renders the stop cock more nearly vacuum tight than would otherwise be the case.

The present stop cock is particularly adapted for use in connection with devices that periodically require additional evacuation in order to maintain them at their maximum efficiency of operation, such, for instance, as vapor current-rectifying devices, the pipe 5 being connected to the vacuum pump and the lower end of the member 1 being inserted in the rectifying or other device.

When it is desired to evacuate the device in connection with which the stop cock is employed, the plug 15 should be rotated until the transverse passage 21 therethrough connects both portions of the passage 2. While the evacuating process takes place, mercury should fill the spaces above and below the plug 15, and also the receptacles 24 and 25. When the evacuating process has been carried forward to the desired degree, the plug 15 should be rotated until the passage 22 connects the space at the upper end of the plug with the upper portion of the passage 2, whereupon mercury will partially fill the upper portion of the passage 2 and will surround the plug portion of the member 15, thus enhancing the tightness of the joint. When it is desired to again evacuate the device in connection with which the stop cock is employed, the plug should be first rotated until the passage 23 connects the upper portion of the passage 2 with the space below the plug, whereupon the mercury contained in the upper portion of the passage 2 will flow through into said space, and from thence into the receptacle 25, from which it may be drawn when necessary by any convenient means. The plug should then be rotated until the transverse passage 21 therethrough connects the upper and lower portions of the passage 2, when evacuation may again take place.

I claim as my invention:

1. In a stop cock, the combination with a body member having a main passage extending therethrough and an inclined chamber or passage crossing, and communicating upon both sides with, the main passage, of a plug located in the inclined chamber or passage and provided with passages, one of which extends transversely of the plug and at an inclination to its axis and is adapted to connect the two parts of the main passage in the body member, another of said passages extending from one side of the plug to its upper end and being adapted to connect the portion of the inclined chamber or passage that is above the plug with the upper portion of the main passage in the body member, and a third passage extending from one side of the plug to its lower end and being adapted to connect the portion of the inclined chamber or passage that is below the plug to the upper portion of the main passage in the body member, and a fluid contained in the inclined chamber or passage in the body member above and below the plug.

2. In a stop cock, the combination with a body member having a main passage extending therethrough and an inclined chamber or passage crossing, and communicating upon both sides with, the main passage, of a plug located in the inclined chamber or passage and provided with passages, one of which extends transversely of the plug and at an inclination to its axis and is adapted to connect the two parts of the main passage in the body member, another of said passages extending from one side of the plug to its upper end and being adapted to connect the portion of the inclined chamber or passage that is above the plug with the upper portion of the main passage in the body member, and a third passage extending from one side of the plug to its lower end and being adapted to connect the portion of the inclined chamber or passage that is below the plug to the upper portion of the main passage in the body member, a fluid contained in the inclined chamber or passage in the body member above and below the plug, and receptacles communicating, respectively, with the inclined chamber or passage above and below the plug.

3. In a stop cock, the combination with a body member having a main passage extending therethrough and an inclined chamber or passage crossing, and communicating upon both sides with, the main passage, of a plug located in the inclined chamber or passage and provided with passages respectively adapted to communicate with the upper portion of the main passage in the body member when the plug occupies different positions, one of said passages extending transversely through the plug and at an inclination to its axis, another extending from one side thereof to its upper end, and the other extending from one side thereof to its lower end.

4. In a stop cock, the combination with a body member having a main passage extending therethrough and an inclined chamber or passage crossing, and communicating upon both sides with, the main passage, of a plug located in the inclined chamber or passage and provided with passages respectively adapted to communicate with the upper portion of the main passage in the body member when the plug occupies different positions, one of said passages extending transversely through the plug and at an inclination to its axis, another extending from one side thereof to its upper end, and the other extending from one side thereof to its lower end, and a fluid contained in the inclined chamber above and below the plug.

5. In a stop cock, the combination with a body member having a main passage extending therethrough and an inclined chamber or passage crossing, and communicating upon both sides with, the main passage, of a plug located in the inclined chamber or passage and provided with passages respectively adapted to communicate with the upper portion of the main passage in the body member when the plug occupies different positions, one of said passages extending transversely through the plug and at an inclination to its axis, another extending from one side thereof to its upper end, and the other extending from one side thereof to its lower end, a fluid contained in the inclined chamber above and below the plug, and receptacles communicating respectively with the inclined chamber above and below the plug.

6. In a stop cock, the combination with a body member having a chamber that is inclined to the vertical and a passage that crosses the said chamber, of a plug within the inclined chamber provided with passages respectively adapted to communicate with an upper portion of the cross passage in the body member when the plug occupies different positions, one of said passages extending transversely through the plug and at an inclination to its axis, another extending from one side thereof to its upper end, and the other extending from one side thereof to its lower end.

7. In a stop cock, the combination with a body member having a chamber that is inclined to the vertical and a passage that crosses the said chamber, of a plug within the inclined chamber provided with passages respectively adapted to communicate with an upper portion of the cross passage in the body member when the plug occupies different positions, one of said passages extending transversely through the plug and at an inclination to its axis, another extending from the side thereof to its upper end, and the other extending from one side thereof to its lower end, and a fluid contained in the inclined chamber above and below the plug.

8. In a stop cock, the combination with a body member having a chamber that is inclined to the vertical and a passage that crosses the said chamber, of a plug within the inclined chamber provided with passages respectively adapted to communicate with an upper portion of the cross passage in the body member when the plug occupies different positions, one of said passages extending transversely through the plug and at an inclination to its axis, another extending from the sides thereof to the upper end, and the other extending from one side thereof to its lower end, a fluid contained in the inclined chamber above and below the plug, and receptacles communicating, respectively, with the inclined chamber above and below the plug.

In testimony whereof, I have hereunto subscribed my name this 8th day of December 1910.

YASUDIRO SAKAI.

Witnesses:
  OTTO S. SCHAIRER,
  B. B. HINES.